United States Patent

Kokush et al.

[11] Patent Number: 5,868,031
[45] Date of Patent: Feb. 9, 1999

[54] TRIAXIAL GYROSCOPIC STABILIZER FOR MOVIE OR TELEVISION CAMERA

[75] Inventors: Anatoly Akimovich Kokush, Staliugrada, Ukraine; Vladimir Vasilievich Fateev, Moscow, Russian Federation; Lev Nikolaevich Evstratov; Vladimir Vladimirovich Kozlov, both of Moskovskaja obl., Russian Federation

[73] Assignee: Anatoliy Kokush, Kiev, Ukraine

[21] Appl. No.: 875,909

[22] PCT Filed: Feb. 6, 1996

[86] PCT No.: PCT/UA96/00001

§ 371 Date: Aug. 6, 1997

§ 102(e) Date: Aug. 6, 1997

[87] PCT Pub. No.: WO96/24822

PCT Pub. Date: Aug. 15, 1996

[30] Foreign Application Priority Data

Feb. 7, 1995 [RU] Russian Federation ............. 95101886
Jan. 22, 1996 [UA] Ukraine ................................ 96010245

[51] Int. Cl.$^6$ .................................................. G01C 19/04
[52] U.S. Cl. ............................. 74/5.34; 74/5.22; 74/5.46; 74/5.42
[58] Field of Search ............................. 74/5.22, 5 F, 5.2, 74/5.46, 490.1, 5.6 D, 5.6 E, 5.6 F, 5.34, 5.42, 5.6 C, 5.4

[56] References Cited

U.S. PATENT DOCUMENTS

| | | | |
|---|---|---|---|
| 2,427,130 | 9/1947 | Ford | 74/5.6 C |
| 3,638,502 | 2/1972 | Leavitt et al. | 74/5.34 |
| 4,989,466 | 2/1991 | Goodman | 74/5.22 |
| 5,184,521 | 2/1993 | Tyler | 74/5.34 |

*Primary Examiner*—Rodney H. Bonck
*Assistant Examiner*—Marcus Charles
*Attorney, Agent, or Firm*—Ilya Zborovsky

[57] ABSTRACT

A triaxial gyroscopic stabilizer for a movie or television camera has a camera in a cardan suspension unit, two three-stage gyroscopes, controlled linkages for adjusting course, banking and pitch, booster-converters, a set of accelerometers, a pitch angle sensor, an integrator, a system shut-off unit, a memory unit, low frequency filters, two computing units, a summator and course and pitch control levers. The cardan suspension unit has an external frame, a middle frame and a platform; the outer frame has the form of a half-fork bracket with an axis of rotation aligned along the course axis; the middle frame has the form of a fork bracket with an axis of rotation aligned along the course axis; the middle frame has the form of a fork bracket with an axis of rotation aligned along the axis of pitch. The first of the two three-stage gyroscopes is mounted on the platform, while the second is mounted on the middle frame.

1 Claim, 2 Drawing Sheets

TRIAXIAL GYROSCOPIC STABILIZER FOR MOVIE OR TELEVISION CAMERA

FIELD OF ART

The proposed invention relates to the field of instrument building, and in particular to controlled gyroscopic stabilizer of an angular position of optical devices which are used for movie and television shooting from various movable carriers: helicopters, automobiles, ships, cranes, etc.

PRIOR ART

A triaxial gyrostabilizer is known, which is formed as a platform in an outside cardan suspension and a tri-channel system of gyroscopic stabilization (D. C. Pelpor "Theory of Gyroscopes and Gyrostabilizers", high school, 1986, page 363). The disadvantage of this device is a small angle of vision of the movie and television camera, complicated construction and operational scheme related to the presence of coordinate convertor, limitation to creative possibilities of an operator connected with the fact that during mounting on the platform of the movie and television camera, panoramics can be performed only in a coordinate system which is connected with the platform. The most close technical solution (prototype) is a gyrostabilizer for a movie camera for shooting from a helicopter (inventor's certificate of the USSR No. 1259775). It is formed as a platform in a cardan suspension with a bearing of a great diameter and an additional watching frame along an axis of a course. Two three-degree gyroscopes are mounted on the platform and form sensitive elements of a system of indicating stabilization. In the construction of the prototype the following sequence of arrangement of the axes of the cardan suspension is provided: An axis of an interior course-an axis of banking (directed parallel to the optical axis of objective and representing an axis of rotation of the bearing of great diameter)—an axis of a pitch-an axis of an exterior course (coinciding with the axis of an additional frame) the introduction of the additional watching frame and the bearing of the great diameter make possible an increase in angles of observation.

In addition to the control and the system of coordinates connected with the platform, the prototype also has a mode of panoramics around a vertical axis. During this process, a control signal is supplied simultaneously to a moment sensors of the three-degree gyroscope which provide the control in accordance with the course and banking. With this, the sum of the speed of rotation of the platform is always directed along a vertical, which provides a horizontality of the frame at any angles of inclination of the platform to the pitch. The values of control signals of the gyroscope are formed in a computing device in accordance with the information about the angle of inclination of platform from the pitch relative to a vertical. This information is obtained by means of a special gyropendulum arranged on the platform.

The disadvantages of the prototype are the following:

inconvenient access to the movie camera;

insufficient accuracy because of a great friction in the bearing of a great diameter;

complicated construction and operational scheme because of the use of the four-frame cardan suspension with an additional frame and a bearing of a great diameter and the mounting of both three-degree gyroscopes on the platform.

the last feature is especially pronounced during vertical shooting with an angle of pitch of the movie camera close to 90°, since in this case it is necessary to change a control alarmism and the operational function of control handles for the course and the banking is changed;

complicated construction because of the use of the special gyropendulum, and also its insufficient accuracy when horizontal accelerations are present.

DISCLOSURE OF THE INVENTION

The invention is based on the objective of providing such a triaxial stabilizer in which the introduction of an integrator, summator, first and second computing blocks, memory blocks a second low frequency filter and a mode shut-off, an axis of rotation of the platform directed toward a pitch, a medium frame formed as a fork and its axis of rotation directed toward a banking, an exterior frame formed as a semi-fork and its axis of rotation directed toward a course, a pitch control handle connected to an output of the integrator, a mode shut-off connected to the memory block and integrator, outputs of a second and third accelerometers connected through a second low frequency filter to the first computing block whose output is connected to the memory block, outputs of the memory block, integrator and sensor of angle of pitch of the platform connected to the input of the summator whose output and output of the course control handle are connected to the input of the second computing block, while its outputs are connected to the sensors of moment of control of the course and banking of the second gyroscope, which provides a simplification of the construction of the triaxial gyrostabilizer, reduction of its size, improvement of axis to the movie and television camera during its regulation, increase of accuracy of the angular stabilization of the movie and television camera and increase of angles of panoramics, automatic maintenance of the horizontality of a frame during shooting from moving carriers, and thereby a reduction of operations for control of the movie and television camera and increase of comfort during its service.

This objective is achieved by the use and the triaxial gyrostabilizer of the movie and television camera of the following features which were known before the characterizing features: maintenance of the movie and television camera in a cardan suspension which is composed of an exterior frame, a medium frame and a platform with axes of rotation, two three-degree gyroscopes with sensors of angle and moment for axes of sensitivity, one of which is mounted on the platform so that one of its axes of sensitivity is parallel to the axes of rotation of the platform, and on the other axis a system of interframe correction is introduced, drives of the course, banking and pitch, booster-convertors, block of three accelerometers with orthogonal axes of sensitivity, while the axis of sensitivity of the first accelerometers is parallel to the axis of rotation of the platform, axis of sensitivity of the second accelerometers is perpendicular to the plane of the platform, and the axis of sensitivity of the third accelerometer is perpendicular to the axis of the pitch, handles for controlling the course and the pitch, a sensor of angle of pitch of the platform, a low frequency filter, wherein the sensors of the angle of pitch of the first gyroscope and the sensors of the angles of course and banking of the second gyroscope are connected through the boosters-converters correspondingly to the drives of the pitch, course and banking, the output of the first accelerometer is connected through a low frequency filter to the sensor of moment of control of the banking of the second gyroscope, while a handle for control of the pitch is connected with the sensor of moment of control of the pitch of the first gyroscope, and the following characterizing features: introduction into it of an integrator, summator, first and second computing blocks, a memory block, a second low frequency filter and a mode shut-off, an axis of rotation of the platform directly toward the pitch, a medium frame formed as a fork and its axis of rotation directed toward the banking, an exterior frame formed as a semi-fork and its axis of rotation directed in accordance with the course, handles of control of the pitch connected to the input of the integrator, a mode shut-off connected to the memory block and integrator, outputs of the second and third accelerometers connected through the second low frequency filter to the first computing block whose output is connected to the memory block, outputs of the memory block, integrator and sensor of angle of pitch of platform connected to the input of the shoemaker whose output and output of the handle of control of the course are connected to the input of the second computing block, and its outputs are connected to the sensors of moment of control of pitch and banking of the second gyroscope.

Due to the use in the proposed triaxial gyrostabilizer of the movie and television camera of the integrator, summator, first and second computing blocks, the memory block, the second low frequency filter and the mode shut-off, the axis of rotation of the platform directed toward the pitch, the medium frame formed as a fork with its axis of rotation directed in accordance with the banking, the exterior frame formed as a semi-fork with its axis of rotation directed in accordance with the course, the handle of control of the pitch connected to the input of the integrator, the mode shut-off connected to the memory block and integrator, the output of the second and third accelerometers connected through the second low frequency filter to the first computing block whose output is connected to the memory block, outputs of the blocks of memory, integrator and sensor of angle of pitch of the platform connected to the input of the summator whose output and the output of the handle of control of the course are connected to the input of the second computing block, while its outputs are connected to the sensor of moment of control of the course and the banking of the second gyroscope, there are provided a simplification of construction of the triaxial gyrostabilizer, a reduction of its size and reduction of its weight, an increase of accuracy of the angular stabilization of the movie and television camera, an elimination of a vibrations of the obtained image and automatic provision of horizontality of the frame, an expansion of a range of angles of panoramics, and also simplification of operation an increase of operator's comfort during shooting from various movable carriers.

BRIEF DESCRIPTION OF THE PREFERRED EMBODIMENTS

Figure 1:
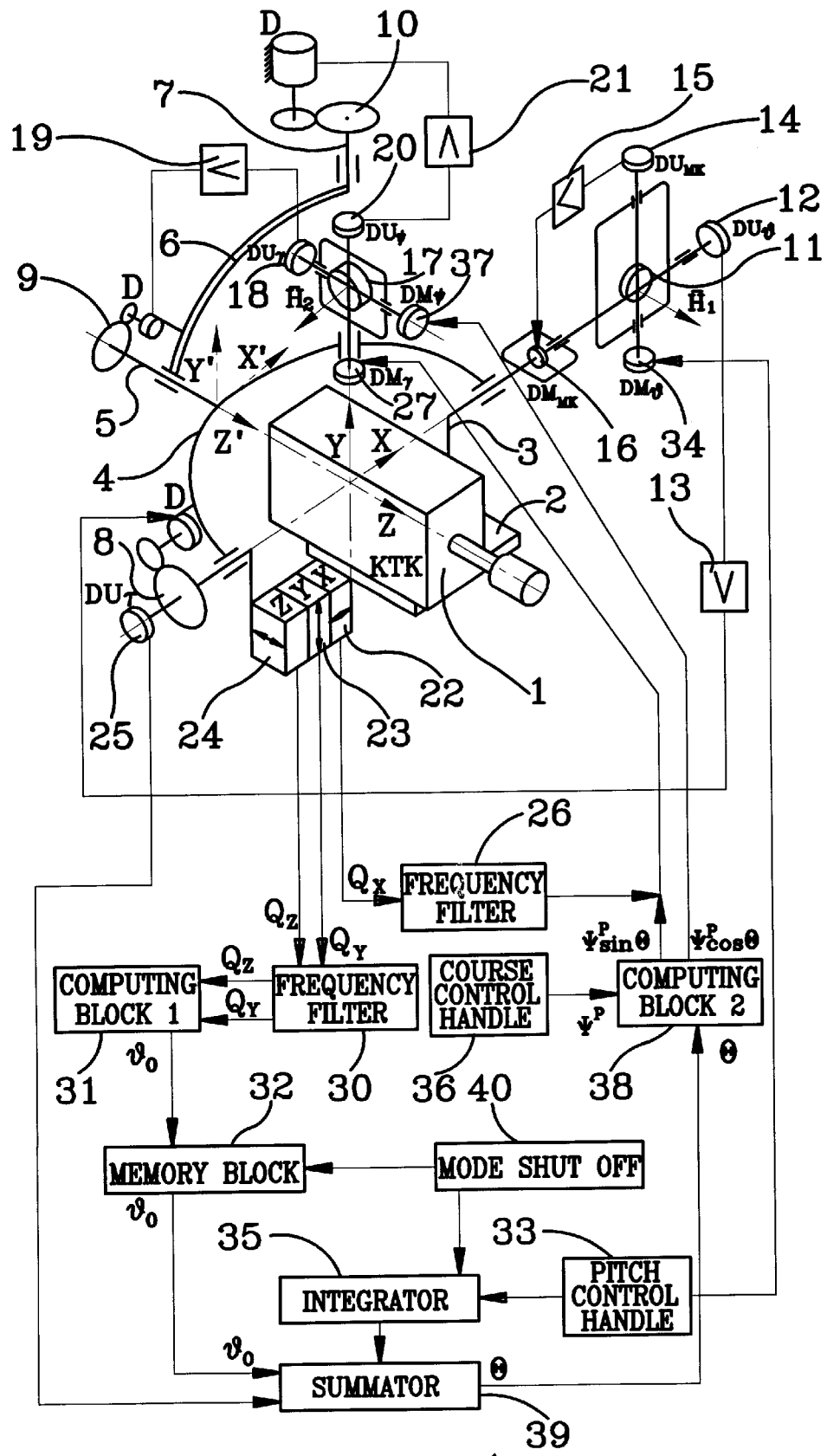
FIG. 1 represents an elector-kinematic diagram of a triaxial gyrostabilizer of a movie and television camera and a structural diagram of a control system of gyrostabilizers.

A gyrostabilizer contains a movie and television camera 1 mounted in a cardan suspension. The cardan suspension includes a platform 2 with an axis of rotation 3 directed toward an axis of pitch of the movie and television camera, a medium frame 4 with an axis of rotation 5 directed toward the axis of banking of the movie and television camera, and exterior frame 6 with an axis of rotation 7 directed toward the axis of course to the movie and television camera. The medium frame is formed as a fork, while an exterior frame 6 is formed as a semi-fork.

Drives of pitch 8, banking 9 and course 10 are arranged on the axes of the cardan suspension. Sensitive elements of the indicator system of stabilization are two, three-degree gyroscopes. A first gyroscope 11 is arranged on the platform so that one of its axes of sensitivities parallel to the axis of rotation 3 of the platform 2. A sensor $DU\vartheta$ of pitch of the gyroscope 12 is arranged on the first gyroscope. The first gyroscope is connected through a booster-convertor 13 to the drive of the pitch 8 to form a system of stabilization in accordance with the pitch. The second axes of sensitivity of the first gyroscope is perpendicular to the axis of the pitch. A sensor of angle $DU_{mk}$ 14 is arranged on the first gyroscope and connected through a booster 15 to the sensor $DM_{mk}$ of the moment 16 to form a system of enter-frame corrections which provides a perpendicularity of the kinematic moment H1 of the first gyroscope to the axis of pitch.

A second gyroscope 17 is arranged on the medium frame 4 so that one of its axis of sensitivity is parallel to the axes of rotation 5 of the medium frame. A sensor of angle $DU\gamma$ 18 is arranged on this axis and connected through a booster-convertor 19 to the drive of banking 9 to form a system of stabilization for the banking. The second axis of sensitivity of the gyroscope is perpendicular to the plane of the medium frame 4 and in its initial position is parallel of course 7 of the stabilizer. A sensor angle $DU\psi$ 20 is arranged on this axis and connected through a booster-convertor 21 to a drive of the course 10 to form a system of stabilization for the course.

A block of accelerometers with orthogonal axes of sensitivity is mounted on the platform 2. The axis of sensitivity of the first accelerometer 22 is parallel to the axis of the platform 2, the axis of sensitivity of the second accelerometer 23 is perpendicular to the plane of the platform, and the axis of sensitivity of the third accelerometer 24 is perpendicular to the axis of rotation 3 of the platform 2 (axis of pitch). A sensor $DU_t$ of the pitch 25 of the platform 2 is mounted on the axis of the pitch 3. The output of the first accelerometer 22 is connected through a low frequency filter 26 to a sensor of moment $DM\gamma$ 27 of the second gyroscope 17 to form a system of horizontal correction of the gyrostabilizer for banking. A control of the gyrostabilizer is performed from a control board 28 connected to an electronic block 29.

In order to determine a position of the platform relative to a vertical for a pitch, accelerometers 23 and 24 are provided, and connected through low frequency filters 30 and a first computing block 31 to a memory block 32.

For controlling the movie and television camera 31 in accordance with the pitch, the output of the control handle for the pitch 33 is connected to a sensor $DM\upsilon$ of a moment 34 of the first gyroscope. The same output is connected to the integrator 35 for determination of an absolute angle of turning of the movie and television camera 1 in accordance with the pitch.

For controlling the movie and television camera 1 in accordance with the course, in connected axes the output of the handle of control of the course 36 is connected to the sensor of moment $DM\psi$ 37 of the second gyroscope. For controlling in accordance with the course around a vertical axis, the same output is connected to the sensors of moment $DM\psi$ 37 and $DM\gamma$ 27 of the second gyroscope through a computing block 38. An output of a summator 39 is also connected to this computing block, and the integrator 35, the memory block 32 and the sensor of angle of pitch 25 are connected to the input of the summator. Also, an output of a mode shut-off 40 is connected to the memory block 32 and the integrator 35. The device operates in the following manner: An angle stabilization of the position of the platform 2 with the movie and television camera 1 mounted on it is performed by the drives of pitch 8, banking 9 and course 10 in accordance with signals of deviation of the platform 2 from a given position, taken from the sensors of angles DUυ 12, DUγ 18, DUψ 20 of the gyroscopes 11 and 17.

In accordance with the method indicator stabilization, the control of the position of the platform 2 is performed by changing a position of the gyroscopes. It is performed by supply of signals from the corresponding handles of control to the sensors of moment DMυ 34 of the first gyroscope 11, DMγ 37 of the second gyroscope 17.

The proposed kinematics of the cardan suspension and the position of the second gyroscope on the medium frame contributes to the fact that with unlimited angles of pitch of the platform, the relative position of the axes of sensitivity of the second gyroscope and the axes of stabilization in accordance with the banking 5 and pitch 7 is not changed, so that it is possible not to use in the gyrostabilizer a convertor of coordinates and to simplify the construction. The inclinations of the stabilizer in accordance with the banking change relative position of the axes of sensitivity of the second gyroscope in accordance with the course and the axis of stabilization of the platform in accordance with the course. However, these inclinations in the practice are usually not great and they do not substantially influence the operatability of the course channel of the stabilization system. The control of the stabilizer in accordance with the course and banking is performed (in contrast to the prototype) in a system of coordinates which is connected with the medium frame, whose position relative to a horizon (due to limited angles of turning in accordance with the banking) changes insignificantly. During this process no change of the operational functions of the handles of control of the gyrostabilizers for the course and the banking occur.

The circumstances indicated above determine a sequence of location of the axes of the cardan suspension of the gyrostabilizer: pitch-banking-course. During this, an arbitrarily great angle of turning on the interior axis (pitch axis) requires a great angle of observation of the movie and television camera. This objective is solved by making the medium frame 4 in form of a fork, and an exterior frame 6 in form of a semi-fork. In this case the sum angle of observation of the movie and television camera is close to a complete sphere (with the exception of a small cone around an axis of the exterior frame), and in addition an axis to the movie and television camera during its replacement, regulation, tuning, etc. is substantially simplified.

In the majority of shootings from movable carriers, it is necessary to maintain the horizontality of a frame. For this purpose, a system of horizontal correction in accordance with the banking is used. During deviation of the platform from a horizon in accordance with banking, a single from the accelerator 22 which is proportional to this deviation is supplied through the low frequency filter 26 to the sensor of moment DMγ 27 of the second gyroscope, which forces the gyroscope to precess in the horizon. By repeating a position of the gyroscope by means of the stabilization system, the platform is also returned in the horizon in accordance with the banking.

During panoraming in accordance with the course in the connected system of coordinates, the operatability of the system is disturbed. The axis η is directed along a vertical of the spot, whose axis is located in a horizontal plane. The axes X and Y are connected with the platform 2 and the movie and television camera. The angle υ determines a deviation of the platform relative to the horizon. A coordinate system X', Y' is connected with the medium frame, on which the second gyroscope is arranged, which controls the platform in accordance with the course and the banking). Angle θ determines an inclination of the medium frame relative to the horizon, caused by turning of the carrier around the axis of each of the movie and television camera.

During panoraming in accordance with the course in the connected system of coordinates, a signal of control from the handle 36 is supplied to the sensor DMψ of the moment 37 of the second gyroscope. The gyroscope precesses around its axis of sensitivity which is perpendicular to the plane of the medium frame 4. During this process the speed of control $\omega_{65}$ is directed along the axis Y' and has a projection on the axis η which leads to a disturbance of the horizontality of the frame. The system of horizontal correction can not eliminate this error due to its inertia and principally low maximum speed of processing.

In order to maintain the horizontality of the frame, in the proposal a mode is performed in which the panoraming is performed not around the axis Y, but around a vertical ξ. During this a projection of the angular speed $\omega_{86}$ onto the axis η is equal to zero, which excludes the above mentioned error. For this purpose, a signal from the handle of control 36 is supplied simultaneously to the sensors of moment DMγ 37 and DMγ 27 of the second gyroscope. Corresponding speeds of presession of the second gyroscope $\omega_{65}$ and $\omega_z'$ are selected so that their vector sum $\omega_{86}$ be directed along the axis ξ, or in other words $$\omega_\xi = \omega_y' \cos\theta + \omega_z' \sin\theta$$

In order to realize this law of control, a computing block $VB_2$ 38 is provided. In this block a signal $\psi_p$ from the handle of control of the course 36 is multiplied by cos θ and sin θ. As a result, signals are supplied to the sensors of moment DMψ 37 and DMγ 27, which are proportional $$\psi_p \cos\theta \text{ and } \psi_p \sin\theta$$

Which provides a precession of the second gyroscope around a vertical with a given speed.

Figure 2:
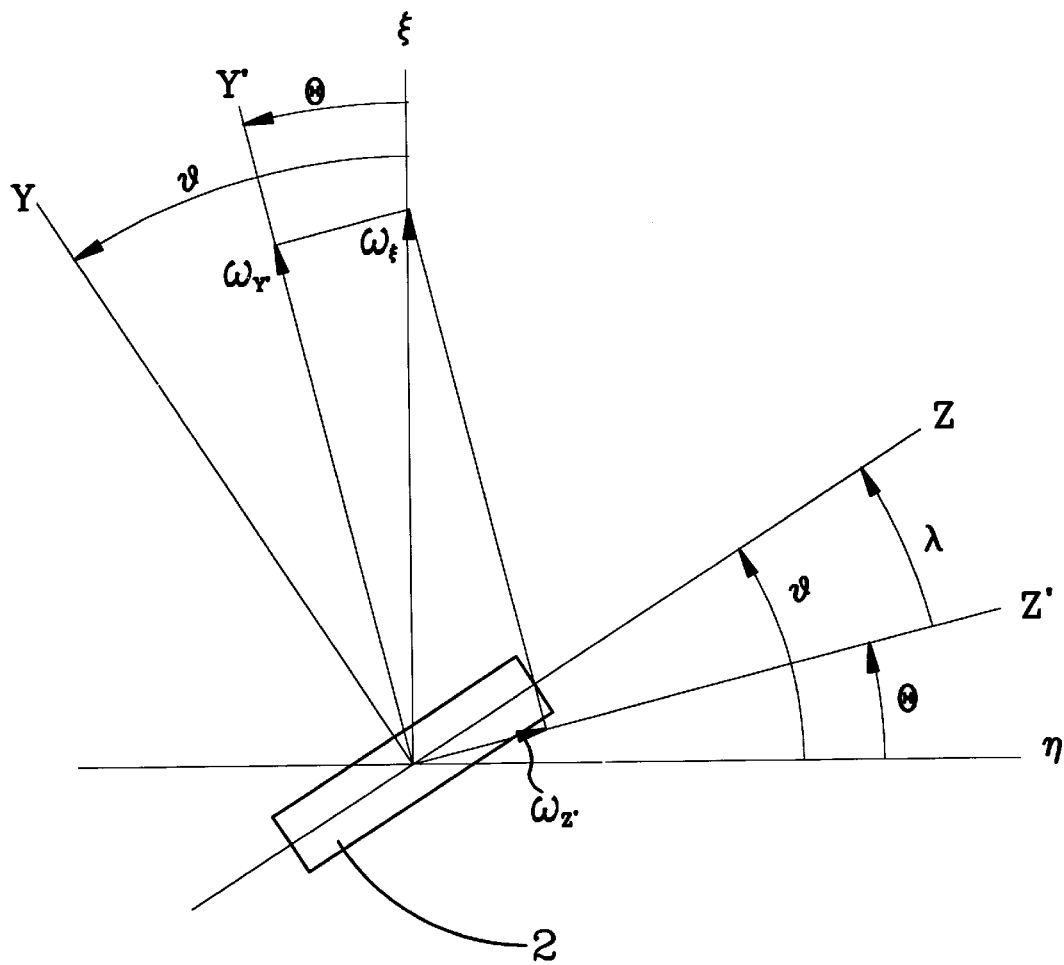
FIG. 2 represents a mutual location of various coordinate systems explaining the operation of the computing block.

In order to obtain a signal which is proportional to the angle θ, a summator 39 in particular is utilized. From FIG. 2 it can be seen, that $$\theta = \upsilon - \lambda$$

The angle λ which is equal to the angle of deviation of the platform in accordance with the pitch relative to the medium frame is measured by the sensor of angle Dγ$_t$ 25. The angle υ of deviation of the platform from the horizon in accordance with the pitch can be represented in the form:

$$\upsilon = \upsilon o + \Delta\upsilon$$

wherein υo is a value of angle υ before turning on of the given mode, and Δυ is an increment which occurs after the turning on of the mode.

In order to obtain the angle υo by the second 23 and third 24 accelerometers, the projections $a_y$ and $a_z$ of a vector g of acceleration of gravity directed along a projections ξ are measured. Corresponding signals are supplied to the computing block $VB_1$ 31 in which a formula is realized $$\upsilon o = \arctg a_z/a_y$$

in order to exclude an influence of disturbances in form of alternating sign horizontal accelerations, a low frequency filter 30 is connected to an input of the accelerometers. This does not allow the use of the accelerometers for measurement of an angle υ after turning on of the mode of panoraming around a vertical axis, since during performance of this mode the platform 2 with the movie and television camera simultaneously can be controlled in accordance with the pitch with great angular speeds and accelerations. Because of this in the proposal, the signal which is proportional to the angle Δυ is obtained by integration of the signal from the handle of control of the pitch 32, which is proportional to the speed of precession of the gyroscope and the platform 2 in accordance with the pitch, on the integrator 35. The signals proportional Δυ and λ are supplied correspondingly from the integrator 35 and the sensor of the angle of pitch of the platform 25, to the summator 39. A signal proportional to υo is also supplied there through the memory block 32. A following function is realized.

$$\theta = \upsilon o = \Delta \upsilon - \lambda$$

A signal from the summator is supplied to a computing block $VB_2$ 38 which provides the performance of the mode of panoraming of the movie camera around a vertical axis. A control of the memory block 32 and the integrator is performed from the mode shut-off 40.

We claim:

1. A triaxial gyrostabilizer of a movie and television camera comprising a movie and television camera (1) in a cardan suspension composed of an exterior frame (6) a medium frame (4) a platform (2) with their axes of rotation, two three-degree gyroscopes (11) (17) with the sensors of angle (12) (14) (18) (20) and moment (16) (34) (27) (37) in accordance with the axes of sensitivity, one of each is mounted on the platform (2) so that one of its axes of sensitivities parallel to the axis of rotation (3) of the platform (2), while a system of interframe correction is introduced in accordance with a second axis, drives of course (10), banking (9) and pitch (8) boosters-converters (13) (19) (21), a block of three accelerometers (22) (23) (24) with orthogonal axes of sensitivity, while the axes of sensitivity of the first accelerometer (22) is parallel to the axis of rotation (3) of the platform (2), the axis of sensitivity of the second accelerometer (23) is perpendicular to the playing of the platform (2), and the axis of sensitivity (24) of the third accelerometer is perpendicular to the axis of pitch, handles of control of the course (36) and pitch (33), a sensor of angle of the pitch (25) of the platform (2), a low frequency filter (30), wherein the sensors of the angles of the pitch (25) of the first gyroscope (11) and the sensors of angles of course (20) and banking (18) of the second gyroscope (17) are connected through boosters-convertors (13) (19) (21) correspondingly to the drives of pitch (8), course (10) and banking (9), an exit of the first accelerometer (22) is connected through a low frequency filter (26) to a sensor of moment (27) of control of the banking of the second gyroscope (17), and a handle of control of the pitch (33) is connected to a sensor of moment (34) of control of the pitch of the first gyroscope (11), characterized in that there are introduced an integrator (35), a summator (39), a first and a second commuting block (31) (38), a memory block (32), a second low frequency filter (30) and a mode shut-off (40), an axis of rotation (3) of a platform (2) is directed to the pitch, the medium frame (4) is formed as a fork and its axis of rotation (5) is directed in accordance with the banking, the exterior frame (6) is formed as a semi-fork and its axis of rotation (7) is directed in accordance with the course, while the handle of control of the pitch (33) is connected to the input of the integrator (35), the mode shut-off (40) is connected to the memory block (32) and the integrator (35), the outputs of the second (23) and the third (24) accelerometers are connected through the second low frequency filter (30) to the first computing block (31), the output of which is connected with the memory block (32), the output of the memory block (32), integrator (35) and sensor of angle of pitch (25) of the platform (2) are connected to the input of the summator (39) whose output and the output of the handle of control of the course (36) are connected to the input of the second computing block (38), and its outputs are connected to the sensors of moment of control of the course (37) and banking (27) of the second gyroscope.

* * * * *